(12) United States Patent
Vlahogeorge

(10) Patent No.: US 9,809,465 B2
(45) Date of Patent: *Nov. 7, 2017

(54) APPARATUS FOR REMOVING MATERIAL FROM A BODY OF LIQUID

(71) Applicant: John T. Vlahogeorge, West Lafayette, IN (US)

(72) Inventor: John T. Vlahogeorge, West Lafayette, IN (US)

(*) Notice: Subject to any disclaimer, the term of this patent is extended or adjusted under 35 U.S.C. 154(b) by 16 days.

This patent is subject to a terminal disclaimer.

(21) Appl. No.: 15/008,568

(22) Filed: Jan. 28, 2016

(65) Prior Publication Data

US 2016/0137527 A1    May 19, 2016

Related U.S. Application Data

(63) Continuation-in-part of application No. 14/454,077, filed on Aug. 7, 2014, now Pat. No. 9,434,631.

(51) Int. Cl.
| | | |
|---|---|---|
| *B01D 21/24* | (2006.01) | |
| *C02F 1/24* | (2006.01) | |
| *C02F 11/00* | (2006.01) | |
| *C02F 103/20* | (2006.01) | |

(52) U.S. Cl.
CPC ............ *C02F 1/24* (2013.01); *B01D 21/2466* (2013.01); *B01D 21/2472* (2013.01); *C02F 11/00* (2013.01); *C02F 2103/20* (2013.01)

(58) Field of Classification Search
CPC .............. B01D 21/245; B01D 21/2466; B01D 21/2472
USPC ............................. 210/523, 524, 532.1, 803
See application file for complete search history.

(56) References Cited

U.S. PATENT DOCUMENTS

| | | |
|---|---|---|
| 1,694,668 A | 12/1928 | Peters |
| 1,703,041 A | 2/1929 | Imhoff |
| 3,013,395 A | 12/1951 | Gaylord |
| 2,732,944 A | 1/1956 | Hays |
| 3,916,834 A | 11/1975 | Buss |
| 3,994,811 A | 11/1976 | Cohen et al. |
| 4,163,035 A | 7/1979 | Gorsky |
| 4,181,614 A | 1/1980 | Steenhorst |
| 4,278,546 A | 7/1981 | Roesler |
| 4,368,691 A | 1/1983 | Brune |
| 4,376,048 A | 3/1983 | Kovacs |
| 4,448,689 A | 5/1984 | von Nordenskjold |
| 4,600,338 A | 7/1986 | Van Bruwaene et al. |
| 4,863,594 A | 9/1989 | Pedretti |
| 4,913,819 A | 4/1990 | Patterson |
| 4,921,614 A | 5/1990 | Frickman et al. |
| 5,139,659 A | 8/1992 | Scott |

(Continued)

FOREIGN PATENT DOCUMENTS

| | | |
|---|---|---|
| DE | 2061266 | * 12/1970 |
| DE | 43 25 010 A1 | 2/1995 |

*Primary Examiner* — Christopher Upton
(74) *Attorney, Agent, or Firm* — Woodard, Emhardt, Moriarty, McNett & Henry LLP

(57) ABSTRACT

An apparatus to remove sludge from a reservoir of liquid. A downwardly opening enclosure is positioned atop the floor of a reservoir with the enclosure having inlets for sludge and liquid to flow into the cavity. The cavity includes a channel for the sludge and liquid to flow upward in the channel which increases in size. Gas emitters on the edge portions of the enclosure assist the flow of sludge and liquid into the cavity.

14 Claims, 6 Drawing Sheets

(56) References Cited

U.S. PATENT DOCUMENTS

| | | |
|---|---|---|
| 5,161,914 A | 11/1992 | Rahn et al. |
| 5,176,838 A | 1/1993 | Chin et al. |
| 5,199,378 A | 4/1993 | Kissick, Jr. et al. |
| 5,217,609 A * | 6/1993 | Holdeman ......... B01D 21/2466 210/532.1 |
| 5,435,924 A | 7/1995 | Albertson |
| 5,538,627 A | 7/1996 | Gargiulo |
| 5,772,885 A | 6/1998 | Sarrouh |
| 6,220,822 B1 | 4/2001 | Khudenko |
| 6,234,323 B1 | 5/2001 | Sarrouh |
| 6,878,295 B2 | 4/2005 | Hubenthal et al. |
| 6,953,528 B2 | 10/2005 | Nesfield |
| 7,105,096 B2 | 9/2006 | Meurer |
| 7,284,670 B2 | 10/2007 | Schmid |
| 7,459,076 B2 | 12/2008 | Cote et al. |
| 7,462,290 B2 | 12/2008 | Hauge et al. |
| 8,372,274 B2 | 2/2013 | Early et al. |
| 8,440,073 B2 | 5/2013 | Chen |
| 9,434,631 B2 * | 9/2016 | Vlahogeorge ..... B01D 21/2472 |
| 2006/0006126 A1 | 1/2006 | Hadfield et al. |
| 2014/0169989 A1 | 6/2014 | Nakamura et al. |

\* cited by examiner

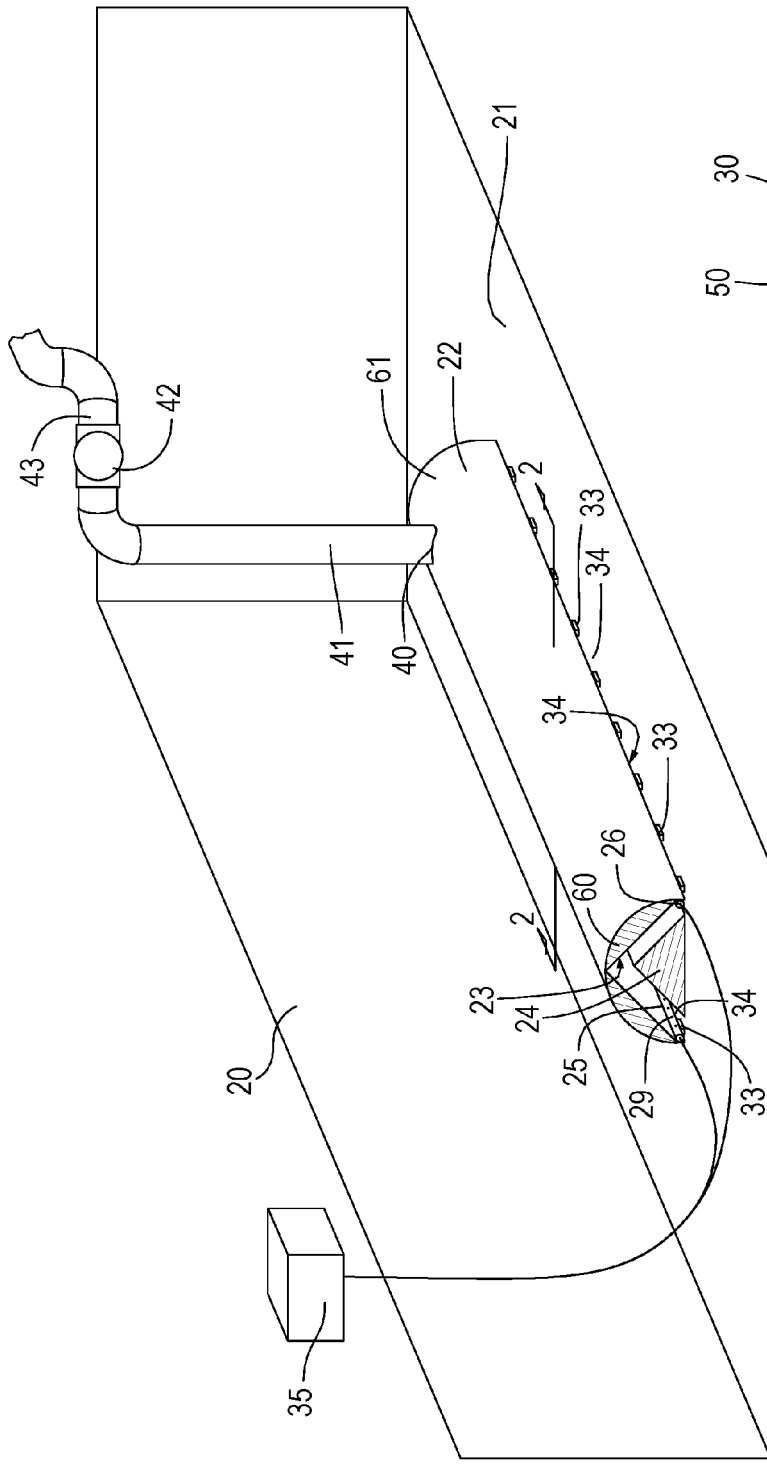
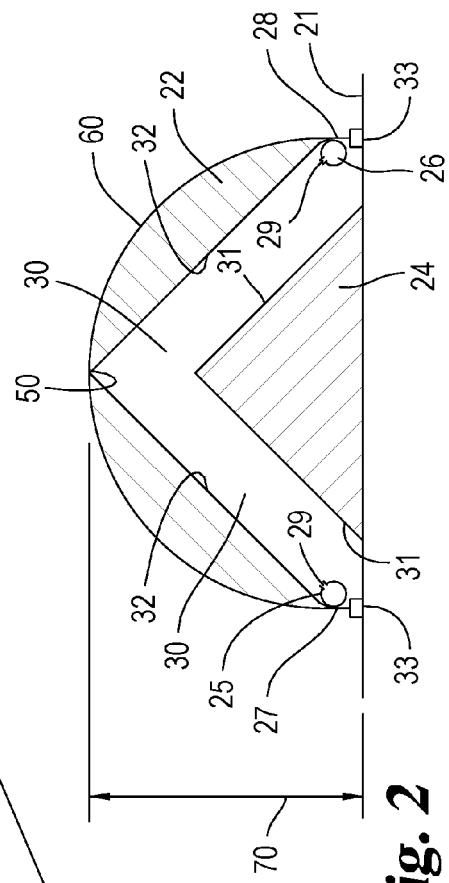
Fig. 1
Fig. 2

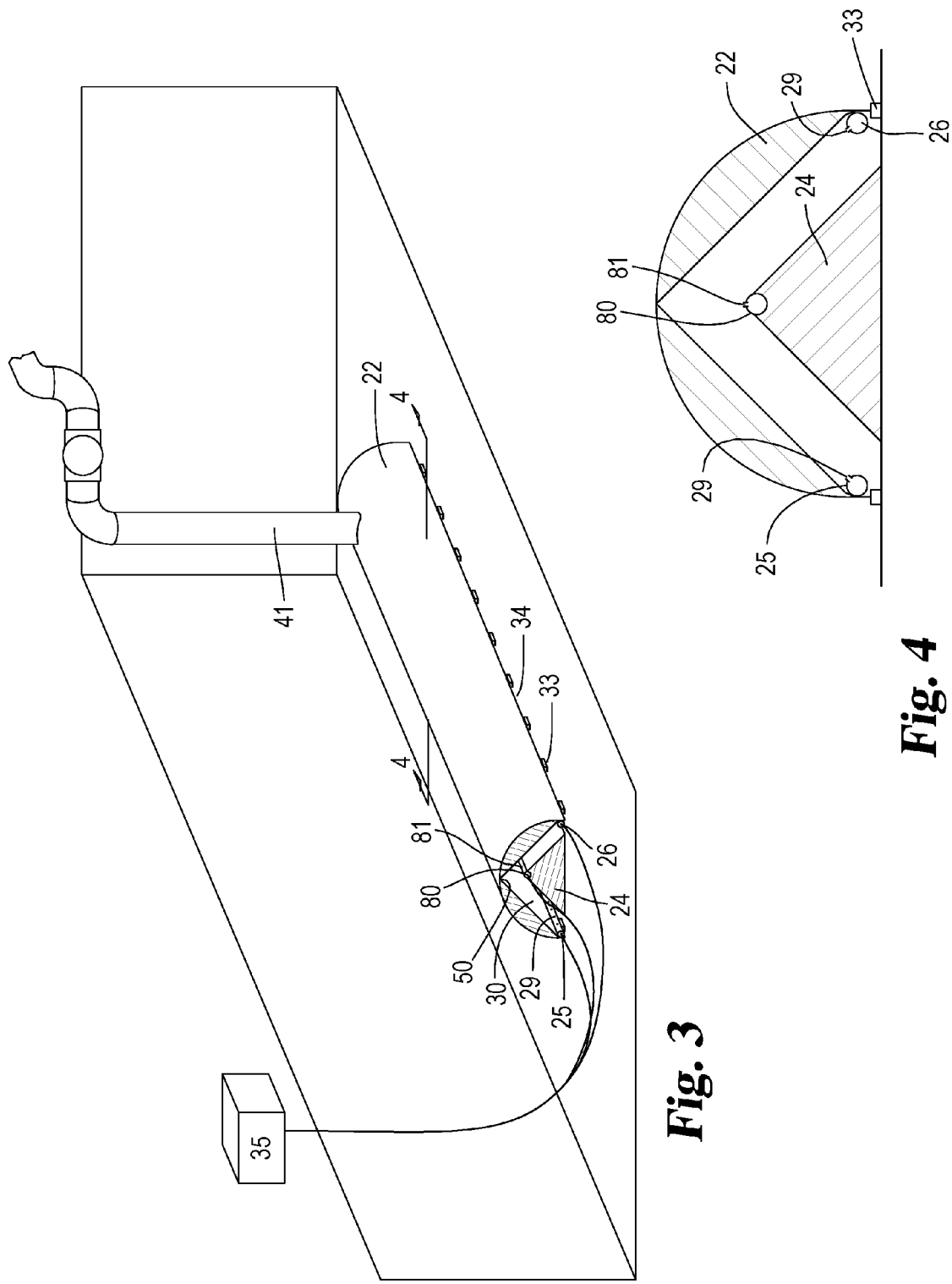

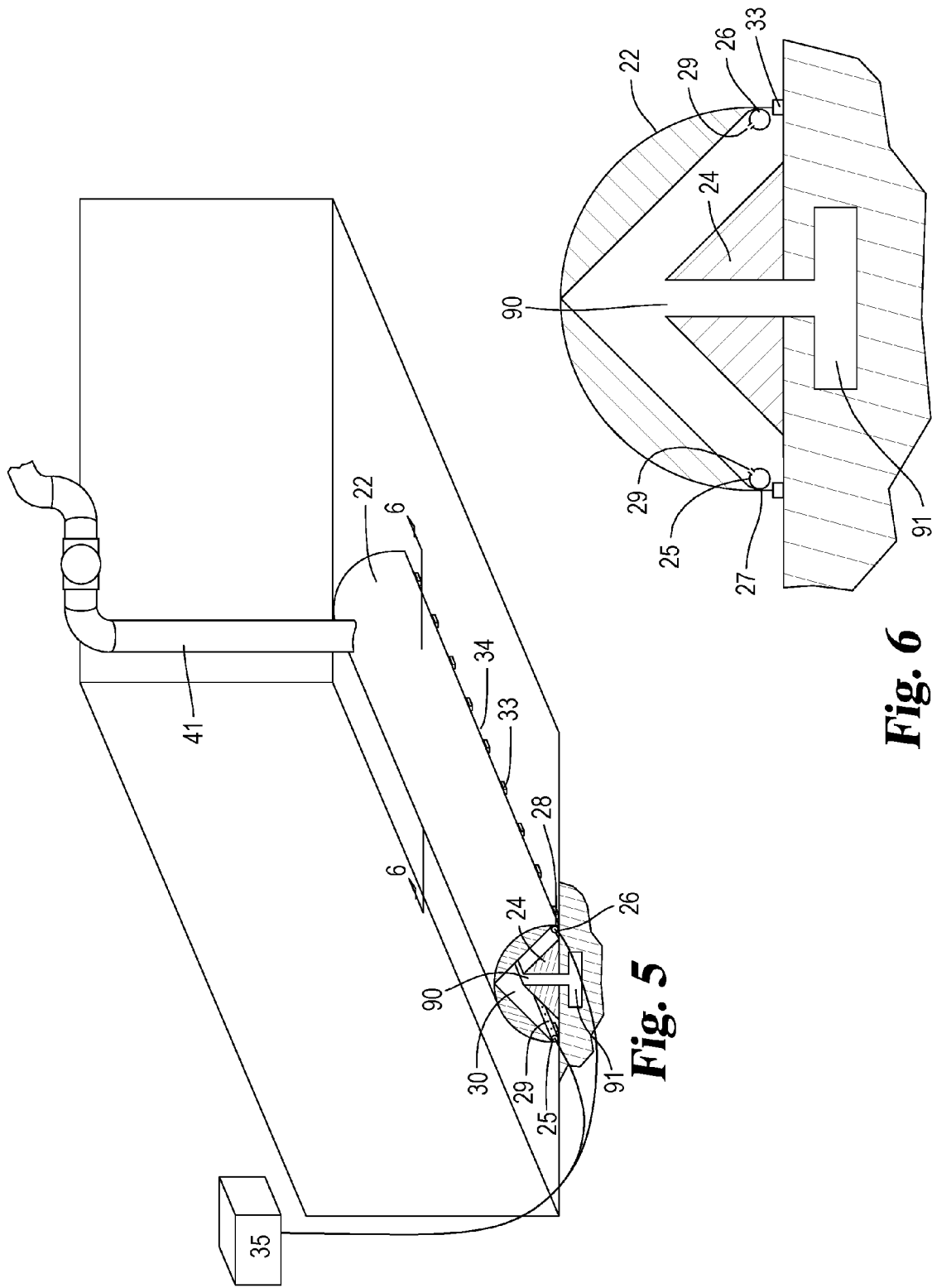

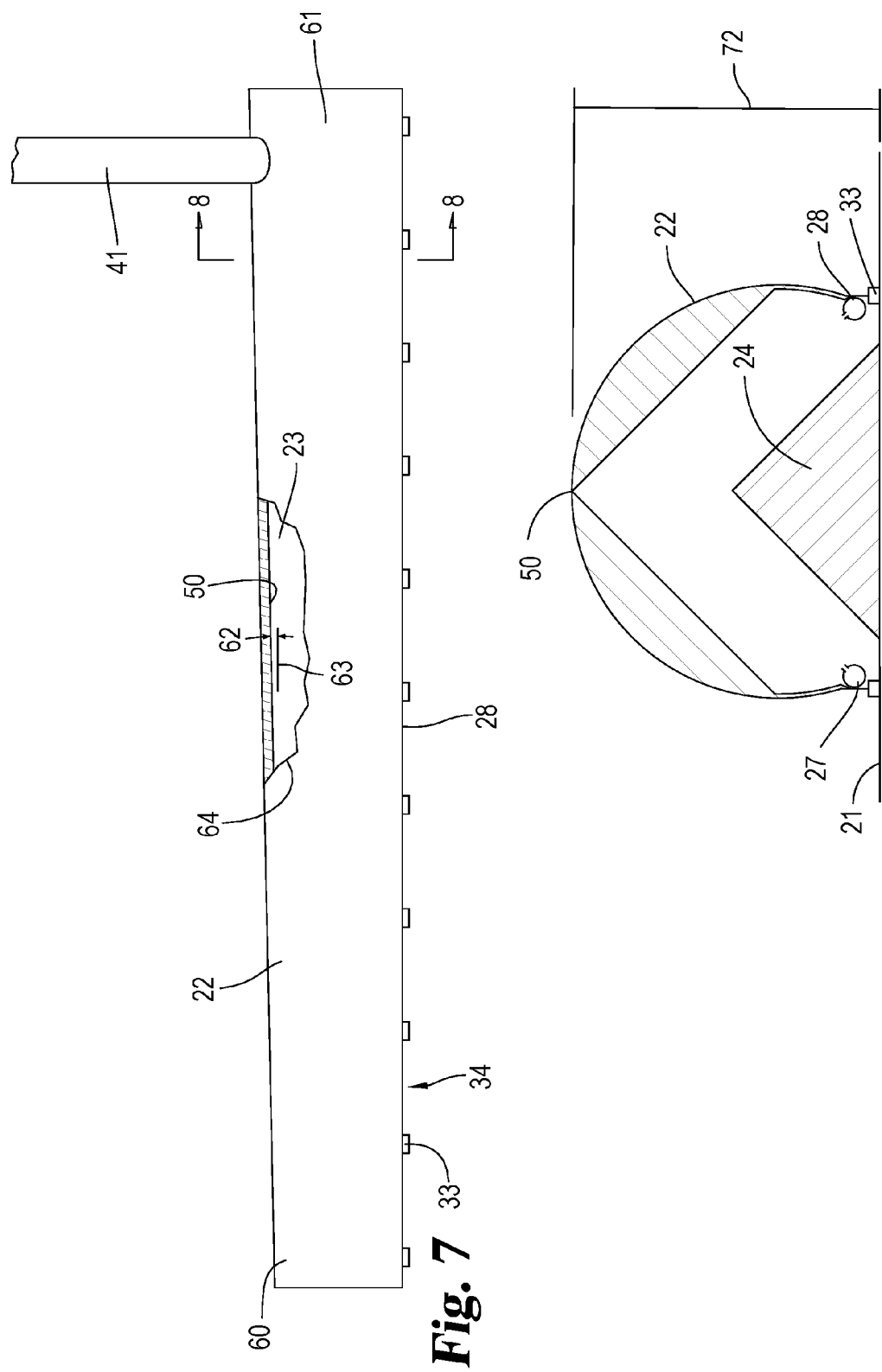

APPARATUS FOR REMOVING MATERIAL FROM A BODY OF LIQUID

CROSS REFERENCE TO RELATED APPLICATION

This application is a continuation-in-part of U.S. patent application Ser. No. 14/44,077 entitled Apparatus for Removing Material from a Body of Liquid.

BACKGROUND OF THE INVENTION

Field of the Invention

The present invention relates generally to the field of devices for removing foreign material from a body of liquid.

Description of the Prior Art

Many different types of reservoirs including tanks for holding a variety of liquids accumulate foreign material at the bottom of the reservoir or tank. Various types of devices have been provided in an attempt to remove the foreign material, typically through the use of air lift pumps requiring expenditure of large amounts of energy. The expense associated with the removal process adds significantly to the overall cross of maintaining the reservoir and tank. Particularly, in the field of raising shrimp or fish, the foreign material in the water can result in the development of a virus negatively impacting the shrimp. It is possible to place chemicals in the water in an attempt to control the virus; however, certain customers object to the use of chemicals detracting from such an approach. Other approaches include genetically engineering the shrimp to avoid the negative impact of the virus. The ultimate solution is to provide clean water for the raising of the shrimp or fish. I have therefore tried many approaches in providing the cleanest water possible to avoid the above problems.

One possible approach is to provide a cone shaped container in which the water is swirled to a bottom drain whereat the waste material is removed. Such an approach again takes considerable energy. Large outside reservoirs provide a very difficult hurdle in such an approach due to the quantity of the water. An object of this invention is therefore to provide clean water in the reservoir or tank in an efficient and low cost manner.

In the U.S. Pat. No. 4,181,614 assigned to The British Petroleum Company Limited, there is disclosed a horizontally extending pipe having a sloping inverted channel connected at its highest point to a riser pipe. Gas in introduced into the sloping inverted channel to direct the foreign material within the liquid to the riser pipe.

Another approach is disclosed in the U.S. Pat. Nos. 5,772,885 and 6,234,323 issued to Sarrouh which use a horizontally extending conduit moved horizontally on a track across the tank bottom. Both the '885 and '323 patents are directed to removing sludge from a wastewater treatment facility.

Another approach is disclosed in the U.S. Pat. No. 7,105,096 issued to Meurer which employs a horizontally extending pipe connected to a vacuum pump causing low pressure to be applied to the pipe for the removal of sludge from the floor of a basin.

The U.S. Pat. No. 4,600,338 issued to Van Bruwaene et al. discloses a device for removing high density foreign material from the bottom of a body of water by means of a horizontally extending intake duct connected to a riser pipe having an airlift pump thereon. U.S. Pat. No. 5,161,914 issued to Rahn et al. discloses a horizontal trench having a perforated casing attached to a vacuum pump by means of a vertical riser, U.S. Pat. No. 1,703,041 issued to Imhoff discloses a device for supplying compressed air at the bottom of a tank to drive oil particles within sewage to the top level of the tank whereat they are removed. U.S. Pat. No. 8,372,274 issued to Early et al. discloses a wastewater treatment system utilizing pumps and filters for decontaminating the wastewater.

In order to remove the foreign material including sludge from the body of liquid while using minimum energy, I have devised an inverted u-shaped conduit that extends along the bottom of the reservoir or tank that, in turn, is connected to a vertically extending outlet pipe. The conduit includes a restricted channel into which gas is directed to pull the foreign material through the inlets of the horizontally extending conduit and then through the channel to the upper most surface of the cavity of the horizontally extending conduit. The uppermost surface slopes gently upward allowing the gas bubbles to move the foreign material and liquid toward the outlet pipe. The upward slope of the innermost surface of the conduit enables the gas bubbles and liquid flow to move under the force of the gas pressure towards the outlet pipe. The channel is formed by an insert located in the cavity having upwardly facing surfaces opposed to the downwardly facing surfaces of the conduit.

A circular or part circular tank is used in certain instances instead of using an elongated reservoir or tank for holding the shrimp or other animals. I have therefore devised a cone shaped device for fitting inside the circular tank for lifting the foreign material and liquid from the bottom of the tank toward the outlet pipe. A major hurdle encountered in designing the device was to minimize the energy required to lift the material and liquid. By using a flow channel which increases in size as the material moves from the bottom of the tank coupled with an arrangement of injecting air into the channel, the amount of energy is minimized. Disclosed herein is such a design. Further, I have discovered that by using the flow channel which increases in size as the material moves from the bottom of the tank coupled with the arrangement of air injection allows a great increase in the volume of liquid that is moved with a small amount of energy. Thus, such a cone shaped device is not restricted to use with only a circular tank or reservoir but also may be used with an oblong or elongated tank. It is further possible to place multiple cone shaped devices along the length or width, of the circular, oblong or elongated tank depending on the volume of water to be moved.

SUMMARY OF THE INVENTION

One embodiment of the present invention is an apparatus, for removing sludge from a reservoir or tank of liquid. The apparatus has an enclosure forming a cavity with edge portions extending over tire reservoir floor. Spacers beneath the edge portions form inlets for sludge and liquid in the reservoir to flow into the cavity. A gas emitting device has outlets adjacent said edge portions to emit gas into the cavity drawing liquid and sludge via the inlets into the cavity. A structure is positioned atop the floor and within the enclosure to define a channel within the cavity between the structure and the enclosure for the liquid and sludge to flow through the channel from the inlets. An outlet leads from the channel for the liquid and sludge to flow out of the cavity.

It is an object of the present invention to provide a new and improved device for removing foreign material from a body of liquid in an efficient manner.

A further object of the present invention is to provide an apparatus for removing foreign material from a circular tank of water used for housing shrimp and fish.

A further object of the present invention is to provide a sludge removal system which moves a great amount of water with minimum input energy.

Related object and advantages of the present invention will be apparent from the following description.

BRIEF DESCRIPTION OF THE DRAWINGS

FIG. 1 is a cutaway perspective view of the first alternate embodiment of the apparatus to remove material from a body of liquid including a conduit extending horizontally across the bottom of the tank with a liquid displacement insert positioned therein and an exit pipe mounted at one end of the conduit.

FIG. 2 is an enlarged cross-sectional view of the conduit and liquid displacement insert taken along line 2-2 of FIG. 1 and viewed in the direction of the arrows.

FIG. 3 is the same view as FIG. 1 only showing the second alternate embodiment having an additional gas emitter mounted atop the liquid displacement insert.

FIG. 4 is an enlarged cross-sectional view of the conduit and liquid displacement insert taken along line 4-4 of FIG. 3 and viewed in the direction of the arrows.

FIG. 5 is the same view as FIG. 1 only showing a third alternate embodiment with the liquid displacement insert having a slot through which heavy sludge may flow.

FIG. 6 is an enlarged cross-sectional view-of the conduit and liquid displacement insert taken along line 6-6 of FIG. 5 and viewed in the direction of the arrows.

FIG. 7 is a fragmented side view of enclosure 22 of FIG. 1 illustrating the positioning of the upper surface 50 of the cavity relative to the horizontal.

FIG. 8 is a cross-sectional view taken along the line 8-8 of FIG. 7 and viewed in the direction of the arrows.

DESCRIPTION OF THE PREFERRED EMBODIMENTS

Figures 9, 10:
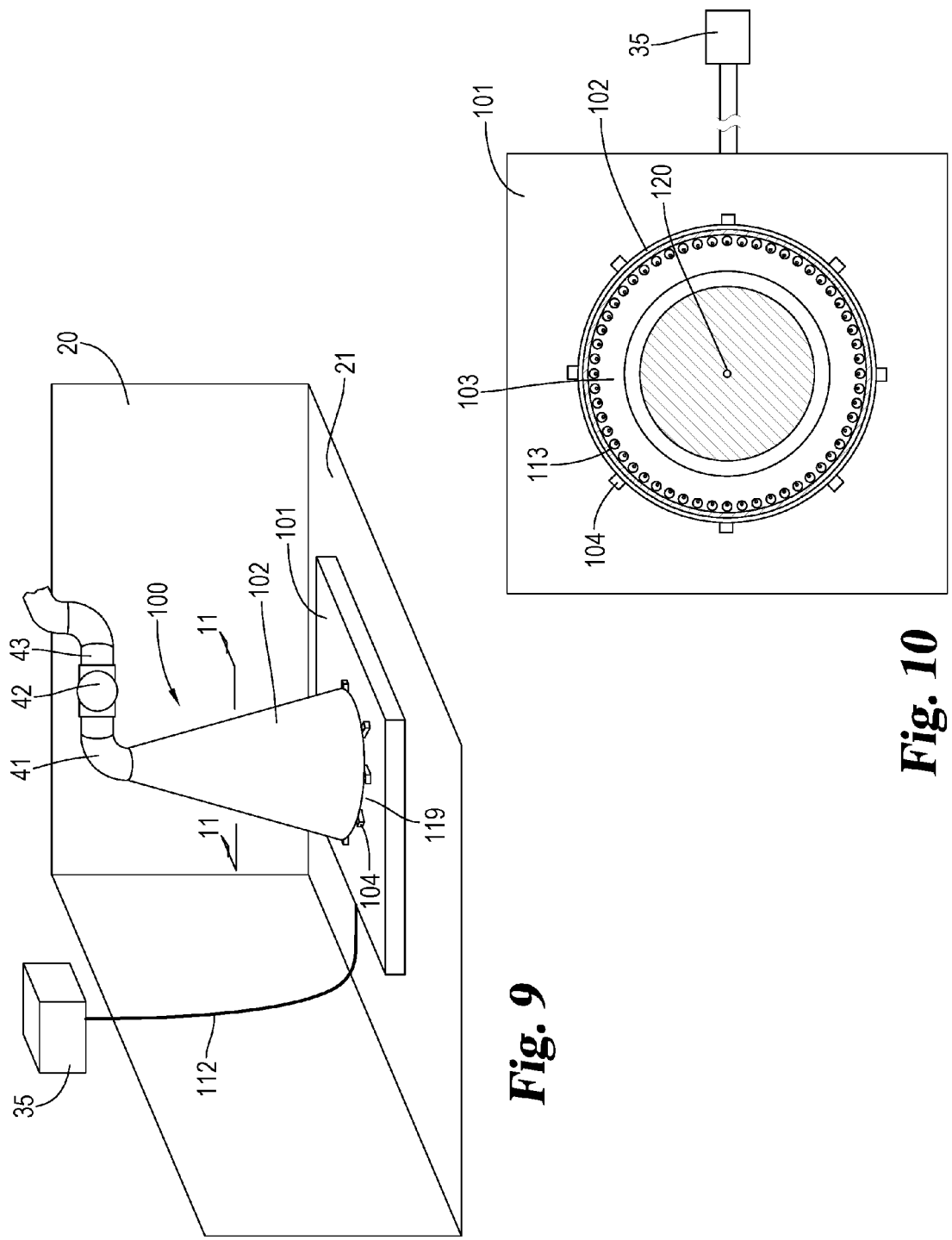
FIG. 9 is a cutaway perspective view of a tank with the preferred embodiment of the apparatus, a cone shaped device, to remove material from the body of liquid within the tank.
FIG. 10 is an enlarged cross-sectional view of the cone shaped device taken along the line of 10-10 of FIG. 11 and viewed in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations find further modifications in the illustrated device, and such further applications of the principles of the invention as illustrated therein being contemplated as would normally occur to one skilled in the art to which the invention relates.

Referring now more particularly to FIG. 1-8, there is shown the alternate embodiments of the present invention. A tank or reservoir 20 for holding liquid is shown. The liquid may include water with foreign material therein such as sludge or animal waste. Extending horizontally across the bottom wall or floor 21 of tank 20 is a conduit 22 having an internal cavity 23 in which is positioned a solid liquid displacement insert 24. Cavity 23 may take a variety of shapes, such as, an inverted u-shape or an inverted v-shape. Fixedly mounted to the bottom edge portions 27 and 28 (FIG. 2) of conduit 22 are respectively, gas emitting tubes 25 and 26 having outlets 29 pointed in the direction of the channel 30 formed between the upwardly facing surfaces 31 of insert 24 and the downwardly feeing surfaces 32 of conduit 22.

The bottom edge portions 27 and 28 ate spaced apart from floor 21 by spacers 33 fixedly mounted to the conduit 22. Spacers 33 are located and spaced apart along the length of the conduit thereby spacing the bottom edge of edge portions 27 and 28 apart from floor 21 and forming a plurality of inlets 34 (FIG. 1) through which the water and sludge may flow into the conduit. Tubes 25 and 26 are connected to a source 35 of pressurized gas such as air.

Conduit 22 includes an outlet 40 (FIG. 1) leading from cavity 23 into an exit pipe 41 mounted thereto. The pipe extends generally upwardly being attached to an optional conventional airlift pump 42 operable to lift the liquid and foreign material within pipe 41 and cavity 23 from outlet 40 and up through lift pipe 41 exiting the tank or reservoir via outlet, pipe 43. Pump 42 is not required for the proper functioning of the device.

In the alternate embodiment shown in FIG. 2, the pair of channels 30 intersect atop the upper corner of the triangular shaped insert 24 forming an upper most surface 50 of cavity 23. Surface 50 extends upwardly from conduit end 60 to conduit end 61 at an approximate angle from one to ten degrees. Thus, the gas or air emitted by tubes 25 and 26 form bubbles which move along surface 50 in a direction from end 60 to end 61 due to the natural inclination of the bubbles to seek the top surface of the liquid within the tank. As the air bubbles extend along surface 50, they cause the liquid and foreign material to move in a direction from end 60 to 61 thereby exiting the conduit via outlet 40 flowing into pipe 41. The interior upper most surface 50 of cavity 23 is shown in the fragmented view in area 64 of FIG. 7 to illustrate the increasing elevation of surface 50 arranged at an angle 62 relative to the horizontal 63.

Ends 60 and 61 are closed in order to allow fluid flow into cavity 23 only through passages 34 with the fluid flow then exiting via outlet, pipe 40. End 60 is shown open in the drawings to illustrate more clearly the internal channels. Surface 50 is spaced apart from floor 21 by distance 70 (FIG. 2) at end 60 with distance 70 increasing to distance 72 (FIG. 8) at the opposite end 61. In other words, surface 50 slopes upwardly relative to floor 21 as tire surface extends from closed end 60 to closed end 61. The bottom, edge portions 27 mid 28 (FIG. 2) are parallel to the floor of the tank or the reservoir and parallel, to the horizontal axis 63 (FIG. 7) with surface 50 being arranged at an acute angle 62 of approximately from one to ten degrees.

The apparatus shown in the drawings can be used for removing sludge from a reservoir of liquid including any type of foreign material that is mixed with water located in the reservoir. Housing 22 is elongated and has a downwardly opening cavity or enclosure extending between the opposite ends of the housing. The opposite edge portions 27 and 28 extend along the length of the enclosure and are supported by means including spacers 33 resting atop the floor of the reservoir forming inlets between the edge portions and the floor for the sludge and liquid in the reservoir to flow into cavity 23. The gas emitters 25 and 26 extend along the length of the opposite edge portions and are connected to a source 35 of pressurized gas to emit gas into the cavity of the enclosure thereby drawing liquid and sludge via the inlets 34 into the cavity. The outlets 29 of the gas emitters 25 and 26 are pointed upwardly into channels 30 formed between the downwardly facing surface 32 of the housing and the upwardly facing surface 31 of structure 24 located within the cavity. In other words, surfaces 31 and 32 cooperatively form the channel through which the liquid and sludge is directed upwardly from the inlets 34 to the upper most portion or surface 50 of the cavity formed by the intersection of the pair of channels 30 intersecting at the apex of the triangular shaped structure 24. An outlet 40 located at one end of the housing is connected to an optional lift pump 42 for withdrawing the liquid and sludge front the cavity. Surface 50 extends generally upward at from one to ten degree angle relative to the horizontal from end 60 to end 61 to allow the natural tendency of gas bubbies to rise thereby pulling the sludge in the liquid upwardly to the outlet with minimum external energy required to move the Liquid and sludge.

Structure 24 is solid and relatively heavy so as to remain stationary on the floor of the reservoir. Structure 24 is a flow direction device positioned between the opposite edge portions 27 and 28 of the enclosure.

FIGS. 3 and 4 illustrate a second alternate embodiment whereas FIGS. 5 and 6 illustrate a third alternate embodiment. Both second and third alternate embodiments are identical to the first alternate embodiment of FIGS. 1 and 2 with exception that the second alternate embodiment includes a booster air emitter 80 (FIGS. 3 and 4) located atop the triangular structure 24 whereas the third alternate embodiment in FIGS. 5 and 6 includes a slot 90 extending the length of structure 24 and also from the top portion of structure 24 to the base of structure 24 which rests atop the floor of the reservoir. Slot 90 empties into a heavy sludge holder 91 cavity located beneath structure 24 and housing 22. In the embodiments shown in FIGS. 2-8, the upwardly facing surfaces 31 of structure 24 as well as surfaces 32 are planar.

In the second alternate embodiment of FIGS. 3 and 4, the apparatus is identical to the apparatus previously described and illustrated in FIGS. 1 and 2 with the exception that a booster gas emitter 80 is mounted to tile top edge of the triangular shaped structure 24. Emitter 80 is a hollow tube extending the length of structure 24 and has a plurality of gas outlets 81 pointed upwardly toward the upper most portion 50 of cavity 23. Outlets 29 of the tubular gas emitters 25 and 26 are likewise oriented upwardly to pull the sludge and liquid through the inlets 34 and into the channel formed between surfaces 31 and 32 causing fluid flow towards the uppermost portion 50 of the cavity whereas emitter 80 adds additional gas in the form of bubbles to the cavity with the bubbles from outlets 81 flowing toward the upper most portion 50 providing additional pressure to force the liquid and sludge from end 60 of the enclosure to end 61 of the enclosure. The outlets 81 and 29 are located along the length of enclosure 22 in the alternate embodiment of FIGS. 3 and 4.

In the alternate embodiment illustrated in FIGS. 5 and 6, the apparatus is identical to the apparatus disclosed and illustrated in FIGS. 1 and 2 with the exception that a slot 90 extends entirely through structure 24 being vertically arranged to extend from the base of the triangular structure 24 to the top of the structure. Likewise, slot 90 extends along the entire length of structure 24 from end 60 to end 61 of enclosure 22. The heavy sludge holder 91 is a cavity located beneath structure 24 to allow sludge which is too heavy to be conveyed through outlet, pipe 41 to simply fall into the slot where it drops into holder 91. Slot 90 forms a passage extending from the cavity 23 to the cavity formed by holder 91. Means are provided to empty heavy sludge holder 90

Figure 11:
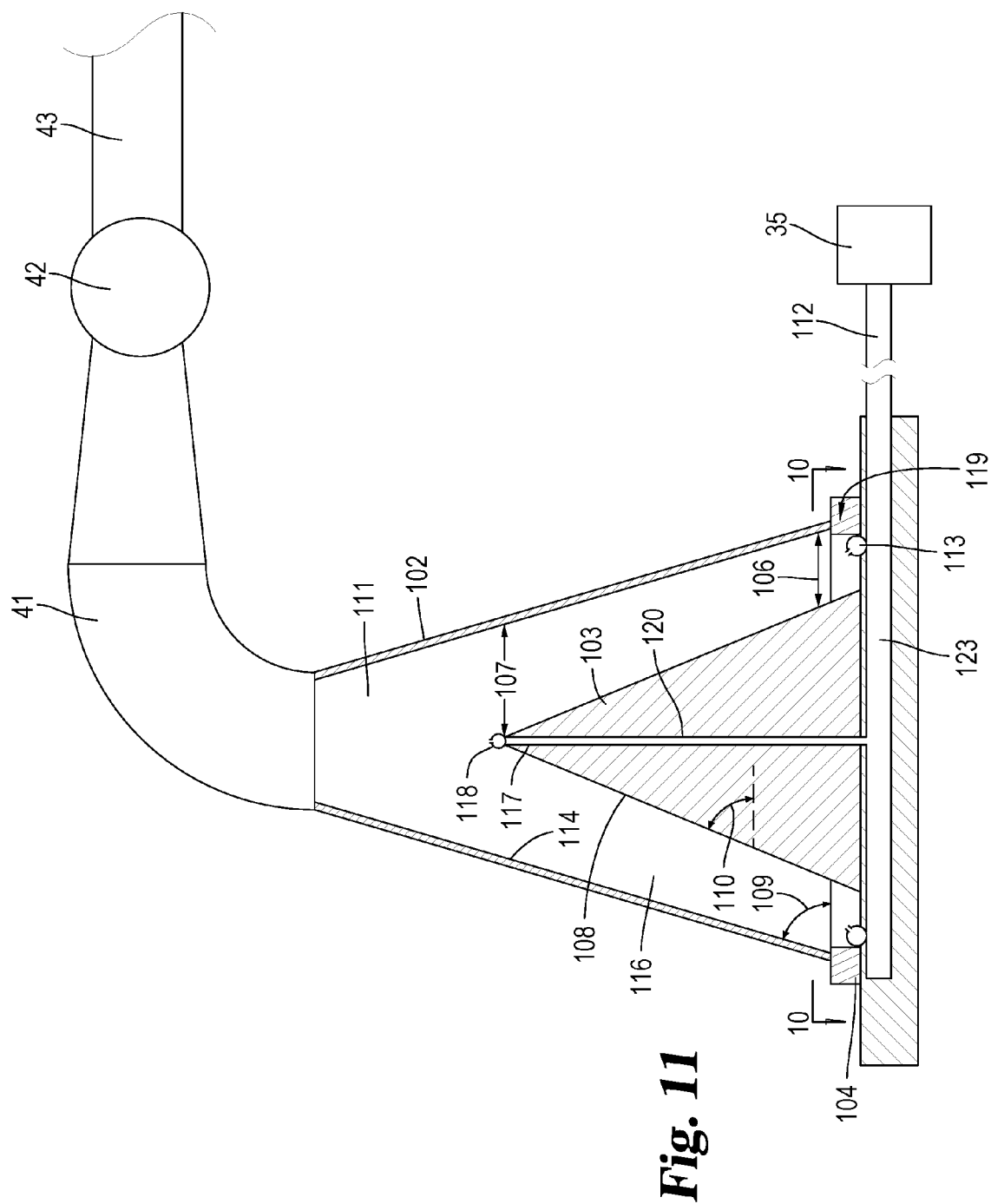
FIG. 11 is an enlarged cross-sectional view of the cone shaped device taken along the line of 11-11 of FIG. 9 and viewed in the direction of the arrows.

The preferred embodiment of the present invention is shown in FIGS. 9-11. A cone-shaped device 100 is positioned in tank or reservoir 20 atop tank floor 21 in lieu of conduit 22 shown in FIG. 1. Multiple devices 100 with or without conduit 22 may also be used in the tank. Cone-shaped device 100 is designed to remove large amounts of liquid and foreign material from the tank with minimum energy. Device 100 has an outer cone shaped shell 102 mounted atop but spaced apart from an inner cone 103. Shell 102 is fixedly mounted atop spacers 104 which are fixedly mounted atop base 101 whereas cone 103 is fixedly mounted atop a base 101 which extends outward from the sides of shell 102 to provide stability to the device and prevent the device from tipping over within the tank. Spacers 104 are spaced apart elevating the bottom edge of shell 102 apart from base 101 forming inlets 119 between spacers 104 and between the bottom edge of shell 102 and base 101.

A source of pressurized gas, namely, air 35 is connected by line 112 to passage 123 provided in base 101 which in turn is connected to air outlets 113 positioned atop base 101 between the inner surface 114 of the shell 102 and the outwardly facing surface 108 of the cone 103. Surfaces 114 and 108 are planar surfaces. Thus, air bubbles move upwardly from the base in the channel 116 surrounding cone 103 between the cone and the shell. The plurality of air outlets 113 are positioned around the circumference of cone 103 allowing the air bubbles to surround the cone and move upwardly toward the top 117 of the cone.

Channel 116 is conical in shape since it surrounds cone 103 and expands in width from the base 101 to the top 107 of the cone since surface 108 of cone 103 is at an angle 110 of 45 degrees relative to horizontal which is less than the angle 109 of 60 degrees formed by the inner surface 114 of shell 102. As a result, the air bubble flow velocity within channel 116 decreases as the bubbles rise to the top of the cone carrying any foreign material within the channel to the top of the cone.

A booster air bubble outlet 118 is provided, at the top 117 of cone 103 and is connected by an air passage 120 extending through cone 103. Passage 120 is connected to passage 123. The air bubbles exiting outlet 118 flow into open ended chamber 111 located between the top of the cone and the outlet pipe 41 between the inwardly facing surface 114 of shell 102. Likewise, the air bubbles and foreign material exit channel 116 into chamber at a relative low velocity as compared to the velocity within channel 116 adjacent base 101. Thus, the air bubbles exiting outlet 118 increase or boost the velocity of the liquid and foreign material within chamber 111 causing flow toward outlet conduit 41. An optional conventional airlift pump 42 is operable to lift the liquid and foreign material within pipe 41 and then exiting the tank or reservoir via outlet pipe 43.

In one version of the preferred, embodiment of the shell shaped cone 100, channel 116 was 4 inches wide between surfaces 108 and 114 at location 106 adjacent base 101 and 6 inches wide at location 107 at the top 117 of cone 103. In this same, version, the inlets 119 were ½ inch high between the bottom edge of shell 102 and base 101 between spacers 104. A total of eight spacers were used to space the shell atop the base. Likewise, in the same version a total of 65 air outlets 113 having ⅛ inch diameter outlet openings were positioned around the circumference of channel 116 adjacent base 101 whereas the air outlet 118 atop cone 103 had a ¼ inch diameter outlet opening. The diameter of cone 103 adjacent base 101 was 36 inches whereas the diameter of shell 102 was 42 inches adjacent base 101. The base in the same version weighed at least 50 pounds.

Many advantages are. achieved with the present invention. In particular, the preferred embodiment is particularly useful in moving a great volume of water with foreign material therein while requiring low energy input to the air pump 35 and liquid pump 42. While the invention has been illustrated and described in detail in the drawings and foregoing description, the same is to be considered as illustrative and not restrictive in character, it being understood that only the preferred and alternate embodiments have been shown and described and that all changes and modifications that come within the spirit of the invention are desired to be protected.

What is claimed is:

1. An apparatus for removing sludge from a reservoir of liquid having a reservoir floor comprising:
   an enclosure forming a cavity with edge portions extending over a reservoir floor;
   spacers beneath said edge portions positionable above the floor of a reservoir of liquid when inserted therein forming inlets between said edge portions, spacers and said floor for sludge and liquid in said reservoir to flow into said cavity;
   a gas emitting device having outlets adjacent said edge portions to emit gas into said cavity of said enclosure drawing liquid and sludge via said inlets into said cavity;
   a structure positionable atop the floor and within said enclosure to define a channel within said cavity between said structure and said enclosure for said liquid and sludge to flow through said channel from said inlets;
   an outlet leading from said channel for said liquid and sludge to flow out of said cavity, and wherein:
   said enclosure includes an outer cone with an inward facing surface, said structure includes an inner cone with a top and is positioned within said outer cone and further has an outer surface facing said inward facing surface of said outer cone, said inward facing surface and said outer facing surface forming said channel which increases in size in a direction from the floor to said top of said inner cone; and further comprising:
   a liquid pump connected to said outlet to move said liquid and sludge from said cavity; and,
   a gas booster outlet positioned at said top of said inner cone assisting flow of said liquid and sludge in said cavity toward said outlet.

2. The apparatus of claim 1 wherein:
   a base atop the reservoir floor and having weight to keep said outer cone and said inner cone in place within said tank.

3. The apparatus of claim 2 wherein:
   said gas emitting device has gas outlets along the circumference of said outer cone.

4. The apparatus of claim 3 wherein:
   said outwardly facing surface of said inner cone is arranged at an approximately 45 degree angle relative to horizontal whereas said inwardly facing surface of said outer cone is arranged at an approximately 60 degree angle relative to horizontal spacing said inwardly facing surface further apart from said outwardly facing surface of said inner cone at the location of said top of said inner cone than at said base.

5. The combination of:
   a reservoir with a reservoir floor and having foreign material mixed with water within said reservoir;
   a housing positioned atop said floor and having a downwardly facing surface cooperatively with said floor defining a cavity, said housing having bottom portions restable atop said floor with inlets provided for foreign material and water from said reservoir to flow into said cavity;
   a structure located within said cavity cooperatively with said housing defining a channel through which said foreign material and water flow;
   gas outlets located along said bottom portions of said housing directing gas into said channel carrying foreign material and water through said inlets into said channel; and,
   a reservoir outlet in communication with said channel to direct said foreign material and water to flow outwardly from said housing and said reservoir;
   said housing is an outer shell with an inwardly facing surface and said structure is positioned within said housing and has an outwardly facing surface spaced apart from said inwardly facing surface forming said channel which is conical in shape and increases in size as said housing and structure extend upwardly with said foreign material and water flowing upwardly through said channel; and,
   a gas booster outlet located atop said structure to direct gas upwardly carrying said foreign material and water in said channel.

6. The combination of:
   a reservoir with a reservoir floor and having foreign material mixed with water within said reservoir;
   a housing positioned atop said floor and having a downwardly facing surface cooperatively with said floor defining a cavity, said housing having bottom portions restable atop said floor with inlets provided for foreign material and water from said reservoir to flow into said cavity;
   a structure located within said cavity cooperatively with said housing defining a channel through which said foreign material and water flow;
   gas outlets located along said bottom portions of said housing directing gas into said channel carrying foreign material and water through said inlets into said channel; and,
   a reservoir outlet in communication with said channel to direct said foreign material and water to flow outwardly from said housing and said reservoir, and wherein:
   said housing is an outer shell with an inwardly facing surface and said structure is positioned within said housing and has an outwardly facing surface spaced apart from said inwardly facing surface forming said channel which increases in size as said housing and structure extend upwardly, and further comprising:
   a base upon which said housing is mounted with said base positioned atop said reservoir floor and extending outwardly from said housing within said reservoir to keep said structure upright,
   a booster gas outlet atop said structure within said shell directing said foreign material and water from said channel to said reservoir outlet.

7. The combination of claim 6 wherein:
   said cavity includes an enlarged chamber above said structure and channel into which said booster gas outlet directs gas against said foreign material and water exiting said channel moving same to said reservoir outlet.

8. The combination of claim 7 wherein:
said structure is an inner cone with a passage extending therethrough from said base to said booster gas outlet.

9. The combination of claim 8 wherein:
said base weighs at least 50 pounds.

10. An apparatus for removing sludge from a reservoir of liquid having a reservoir floor comprising:
a downwardly opening enclosure forming a cavity with edge portions;
means on said enclosure spacing said edge portions above a floor of a reservoir of liquid when inserted therein forming inlets between said edge portions and said floor for sludge and liquid in said reservoir to flow into said cavity;
gas emitters on and extending along said edge portions operable to emit gas into said cavity of said enclosure drawing liquid and sludge via said inlets into said cavity;
an outlet leading from said cavity for liquid and sludge to flow out of said enclosure;
a flow direction device positioned within said cavity between said edge portions directing the liquid and sludge upwardly within said cavity; and,
a liquid pump connected to said outlet to move said liquid and sludge from said cavity, said enclosure has a cavity downwardly facing surface, said flow direction device has an upwardly facing surface opposed to said cavity downwardly facing surface defining a channel through which liquid and sludge from said inlets flow:, and further comprising:
a booster gas emitter mounted to and extending atop said flow direction device emitting gas to assist upward flow of liquid and sludge.

11. The apparatus of claim 10 wherein:
said cavity downwardly facing surface and said upwardly facing surface of said flow direction device are planar surfaces.

12. An apparatus for removing sludge from a reservoir of liquid having a reservoir floor comprising:
an elongated and downwardly opening enclosure having length with a first end and a second end and forming a cavity with an edge portion extending along the length of said enclosure, said enclosure having opposite edge portions, said enclosure further having a cavity downwardly facing surface;
means on said enclosure and said edge portion forming inlets between said enclosure and said floor for sludge and liquid in said reservoir to flow into said cavity;
a source of pressurized gas;
gas emitters connected to said source of pressurized gas extending along the length of said edge portion operable to emit gas into said cavity of said enclosure drawing liquid and sludge via said inlets into said cavity;
an outlet leading from said cavity for liquid and sludge to flow out of said enclosure;
an upwardly extending tube connected to said outlet and extending to external of the reservoir; and,
a flow direction device positioned within said cavity between said edge portions directing the liquid and sludge upwardly within said cavity; said flow direction device having an upwardly facing surface opposed to said cavity downwardly facing surface defining a channel through which liquid and sludge from said inlets flow; and,
a booster gas emitter connected to said source of pressurized gas, said emitter located atop said flow direction device emitting gas to assist flow of liquid and sludge from said channel toward said second end and said outlet.

13. The apparatus of claim 12 wherein:
said cavity slopes upward from said first end of said enclosure to said second end of said enclosure whereat said outlet is located.

14. The apparatus of claim 12 wherein:
said cavity downwardly facing surface and said upwardly facing surface of said flow direction device are planar surfaces, said cavity has an uppermost portion into which said booster gas emitter empties extending upwardly in a direction from said first end to said second end of said enclosure.

* * * * *